United States Patent [19]

Hoffmann

[11] 4,258,598

[45] Mar. 31, 1981

[54] ROTATING GUIDE BUSHING FOR SWISS-TYPE AUTOMATIC SCREW MACHINE

[75] Inventor: George T. Hoffmann, Pittsford, N.Y.

[73] Assignee: Alkron Manufacturing Corp., Rochester, N.Y.

[21] Appl. No.: 47,427

[22] Filed: Jun. 11, 1979

[51] Int. Cl.³ .................... B23B 25/00; B23B 13/00
[52] U.S. Cl. ...................................... 82/38 R; 82/2.5
[58] Field of Search ............................. 82/38 R, 2.5

[56] References Cited

U.S. PATENT DOCUMENTS

| | | | |
|---|---|---|---|
| 2,369,330 | 2/1945 | Wilson | 82/38 R |
| 2,395,365 | 2/1946 | Wilson et al. | 82/38 R X |
| 3,541,903 | 11/1970 | Brinkman et al. | 82/38 R |

*Primary Examiner*—Harrison L. Hinson
*Attorney, Agent, or Firm*—Martin LuKacher

[57] ABSTRACT

A collet rotatably mounted in the tool bracket of a Swiss-type automatic screw machine is assembled with a mechanism for contracting the collet to grip the work with sufficient force to cause the collet to rotate with the work but yet enable the work to translate axially through the collet as it is advanced or retracted by the rotating head stock of the screw machine.

12 Claims, 5 Drawing Figures

ROTATING GUIDE BUSHING FOR SWISS-TYPE AUTOMATIC SCREW MACHINE

The present invention relates to an arrangement for holding and guiding stock which is to be machined in the bracket of a Swiss-type automatic screw machine and particularly to a rotary guide bushing for a Swiss-type automatic screw machine.

A Swiss-type automatic screw machine both rotates and translates the work while it is being machined. The cutting tools do not translate, as is the case in conventional screw machines, but move in and out into cutting relationship with the work. The work being machined is referred to as the "stock" and may be an elongated bar, say 10 to 12 feet in length, which is rotated and advanced or retracted in the main spindle and head stock of the machine.

In order to stabilize and guide the stock as it is being machined, a bushing is provided. This bushing is located in a bracket ahead of the spindle and head stock which rotates and drives the stock. This bracket may be the tool bracket or stand in which the cutting tools are slidably mounted. The guide bushing is lined with hard material such as carbide and can receive stock the diameter of which matches the diameter of the bushing with close tolerance. Stock therefore must be ground to such close tolerances in order to be machined in a Swiss-type automatic screw machine. Inasmuch as the stock must rotate in the bushing, only stock having a circular cross section has been machinable heretofore on such machines.

It is therefore an object of the present invention to provide an improved arrangement for guiding stock in automatic screw machines where the stock is both rotated and translated such as screw machines of the Swiss type.

It is a further object of the present invention to provide an improved rotating guide bushing for Swiss-type automatic screw machines.

It is a still further object of the present invention to provide an improved guide bushing for automatic screw machines which can be manufactured at low cost and is reliable in operation.

It is a still further object of the present invention to provide an improved arrangement for holding and guiding stock in a bracket, such as the tool bracket of a Swiss-type automatic screw machine, which enables the machine to handle stock which deviates to a reasonable degree in cross-sectional dimensions and may be somewhat off round or even of shapes different from round, such as square or hexagonal in cross section.

It is a still further object of the present invention to provide an improved rotating guide bushing for Swiss-type automatic screw machines, the use of which avoids the need for grinding of the stock before machining in the screw machine.

Briefly described, an arrangement embodying the invention, for holding and guiding the stock in the bracket of a Swiss-type screw machine through which the stock moves, contains guide means having a passage therethrough for the stock. The guide means is rotatably mounted in the bracket. The guide means may be a collet. Means are rotatable with the guide means for clamping the guide means against the stock with sufficient force to cause the guide means and also the clamping means to rotate with the stock while permitting the stock to more axially through the guide. The force may be applied by a collet clamp nut which is screwed onto the collet via "O" rings of elastomeric material such as rubber which bear against the collet's sleeve. The collet then grips the stock and rotates therewith. However, when the stock is advanced or retracted, as when the stock of the screw machine moves axially, the collet relaxes at grip on the stock and enables its movement. Inasmuch as the collet is rotatable, stock of various cross sections may be machined is a Swiss-type screw machine equipped with a rotating guide bushing in accordance with the invention. Also, since the collet is expansible and contractible, the stock may differ from a fixed diameter or cross-sectional dimension over a wide tolerance range. Even off-round stock can be machined when a rotating guide bushing in accordance with the invention is used.

The foregoing and other objects, features and advantages of the invention as well as a presently preferred embodiment thereof will be more apparent from a reading of the following description in connection with the accompanying drawings in which.

Figure 1:
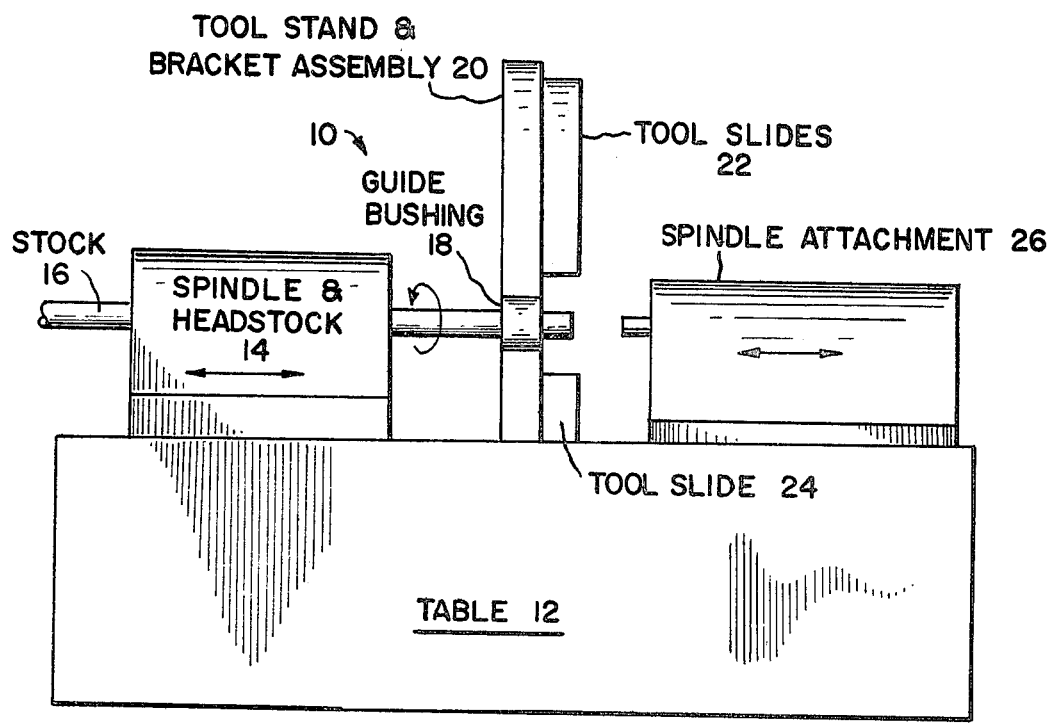
FIG. 1 is a schematic diagram of a Swiss-type automatic screw machine in which the invention may be used.

Referring more particularly to FIG. 1, there is shown a Swiss-type automatic screw machine 10 having a table 12 on which a spindle and head stock 14 is mounted for longitudinal movement. The stock 16 to be machined may be a bar 10 to 12 feet in length. This stock is gripped in the head stock and is rotated by the spingle therein. A guide bushing 18 is mounted in an opening in a tool stand and bracket assembly 20. Tool slides 22 and 24 which may carry cutting tools are mounted on the tool stand and bracket assembly 20. The tools move radially inward so as to machine the stock as it is rotated and moved forward and backward axially through the bushing 18. A spindle attachment 26 may be mounted on the table 12 forward of the tool stand and bracket 20. Drills, bores and reamers may be carried by the spindle attachment 26 for other machining operations on the stock.

Inasmuch as the main spindle and head stock 14 are spaced by at least several inches from the cutting tools, precise guidance at the guide bushing 18 is necessary to enable precision machining of the stock. Swiss-type automatic machines have relied upon precision stationary guide bushings with carbide linings to obtain such precision guidance. A typical Swiss-type automatic screw machine with such a stationary guide bushing is for example the NNC-P2553 sold by Nomura Automatic Lathe Company, of Tokyo, Japan, and references may be had to the catalogs published by the Nomura Company for further information respecting conventional Swiss-type automatic screw machines.

The tool bracket of a Swiss-type automatic screw machine such as shown in FIG. 1 is equipped with a rotating guide bushing 28 which is illustrated in FIGS.

2, 3 and 4. A flanged housing cylinder 30 is mounted in the guide bushing opening 32 in the tool bracket 20. A nut 34 threadedly attached to the and of the housing cylinder 30 clamps the housing cylinder and the guide bushing arrangement housed therein to the tool bracket 20.

It will be observed that the stock, in this case illustrated as a bar with circular cross section, passes through the guide bushing 28 and is available for machining by a cutting tool 36 mounted on a tool slide 22. This tool 36 and tool slide 22 is typical of the cutting tools and slides of the screw machine. The cutting tools may also be mounted on a tool stand separate from the bracket 20.

The stock 16 is guided through the passage in a collet 38. The head or forward end of the collet is tapered outwardly and is slit so that the collet is contractible into clamping engagement with the stock. The collet may be a conventional collet, for example of the 5C type. The rear end of the collet is threaded. A collet clamp nut 40 is screwed on to the rear end thread of the collet 38. A collet sleeve 42 is slidably disposed around the collet 38 and the neck of the collet clamp nut 40. A collet 38 has a keyway (not shown) which receives a key which extends axially along the collet sleeve 42. The forward end of the collet sleeve 42 is tapered and bears against the head of the collet. The inner diameter of the sleeve is recessed to provide clearance 44 so as to avoid unnecessary interference and friction in the movement of the collet 38 and the collet clamp nut 40 with respect to the collet sleeve 42.

A plurality, four for example, "O" rings 46 of elastomeric material such as soft rubber, are disposed side-by-side and adjacent to each other between a shoulder 48 of the collet clamp nut 40 and a surface of the collet sleeve which is perpendicular to the axis of the collet and is depicted as the rear end 50 of the collet sleeve 42. The shoulder 48 and the rear end 50 thus define opposed surfaces between which the "O" rings 46 are located.

Figure 4:
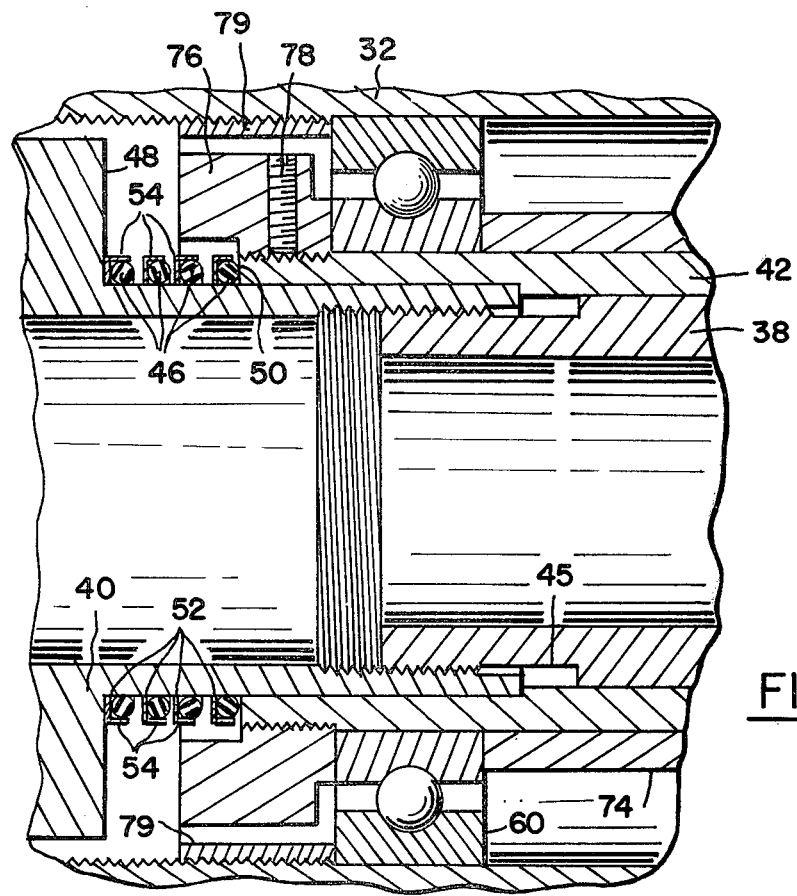
FIG. 4 is an enlarged cross-sectional view showing the portion of the guide bushing illustrated in FIG. 2 where the "O" ring spring mechanism is located.

The "O" rings are separated by retainer rings 52 best shown in FIG. 4. These rings are thin discs of metal having rims 54 which overlie the "O" rings and hold them in place. Each of the "O" rings 46 is disposed adjacent a different one of the rings 52 and held under the rims 54 of the retainer rings 46. Since the rings 46 are of slightly larger diameter than the outer diameter of the "O" rings 46, each of the "O" rings is separated and kept in place so as to perform its spring function as will be explained more fully below.

Figure 3:
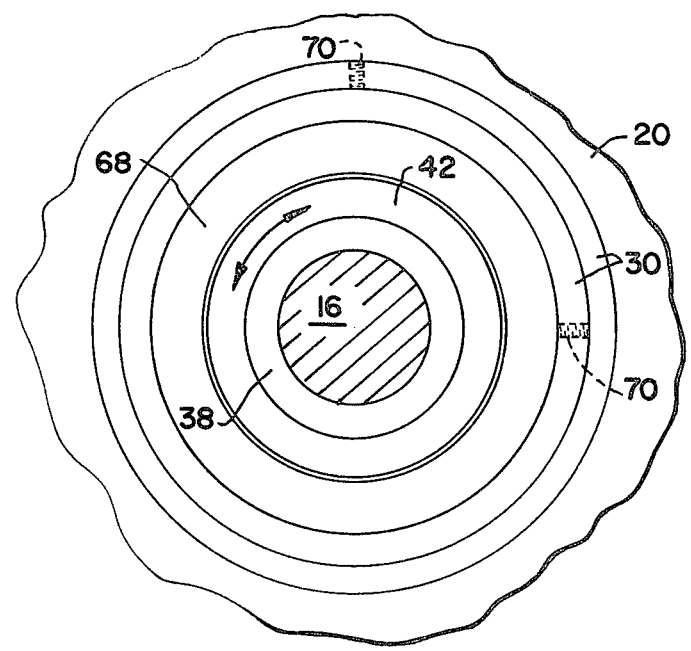
FIG. 3 is an end view of the guide bushing shown in FIG. 2.
Figure 2:
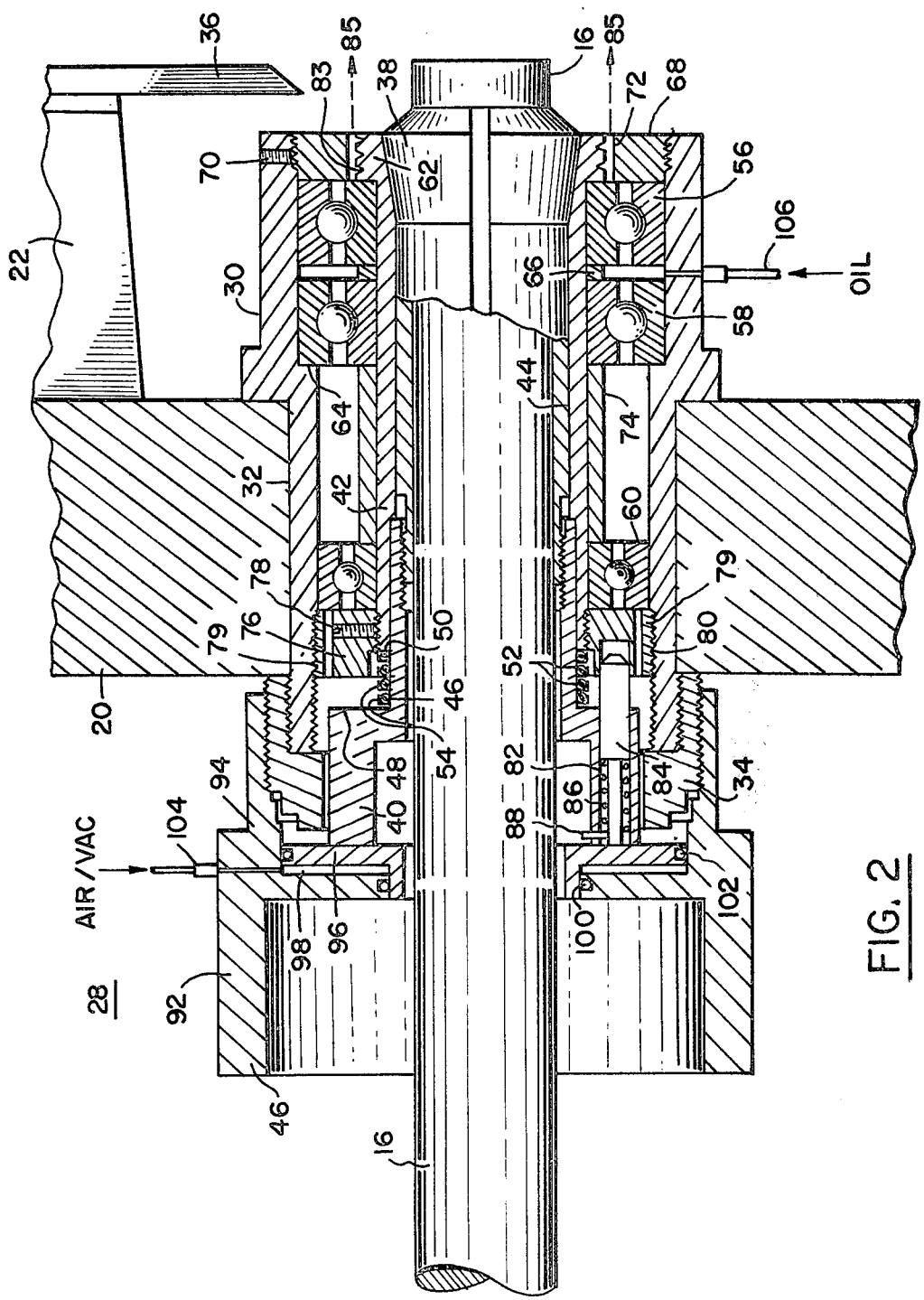
FIG. 2 is a cross-sectional view along a vertical diametral plane through a rotating guide bushing in accordance with an embodiment of the invention.

The collet sleeve, collet clamp nut, and the spring means provided by the "O" rings 46 serve as clamping means to clamp the collet 38 against the stock with sufficient force to cause the collet 38, collet sleeve 42, "O" rings 46, collet clamp nut 40, and the parts assembled therewith, to rotate with the stock as a unitary assembly. This unitary assembly is rotatably mounted in the housing cylinder 30 by three ball bearings 56, 58 and 60. A flange 62 on the forward end of the collet sleeve 42 provides a shoulder for seating the inner race of the bearing 56. The outer race of the bearing 58 is seated against the shoulder 64 along the inner surface of the housing cylinder 30. A spacer ring 66 between the inner races of the bearings 56 and 58 transfers a preloading force applied by a ring 68 which is threaded into the front end of the housing cylinder and may be held in place against rotation by set screws 70 which are 90° apart (see FIG. 3). There is clearance 72 between the flange 62 and the ring 68 so that the collet sleeve 62 and the rest of the rotating assembly can rotate without interference. The rim of the flange is formed with a helical groove 83 with its pitch opposite to the sense of rotation of the stock so that any foreign material or cutting fluid which enters the clearance 72 is expelled and thrown forward out of the assembly in the direction of the dashed arrows 85. For example, where the stock rotates clockwise or viewed from the left in FIG. 2, the pitch of the helix 83 is counter clockwise (viz. a left hand screw). A guard or centrifical splash shield (not shown) may be fastened to the flange and extends radially over the clearance 72 with a space between the guard and the front face of the flange 62 and ring 68. This shield may be used, if still further safeguard against contamination and binding in the bearings is desired.

The loading forces from the ring 68 are applied from the outer to the inner race of the bearing 56, through the spacer 66 and from the outer to the inner race of the bearing 58 to the shoulder 64. The bearings 56 and 58 are also positioned against axial movement by a spacer cylinder 74 which extends between the inner races of the bearings 58 and 60. The bearing 60 is also kept in place by a bearing retaining nut 76 which is screwed into threads around the rear end of the collet sleeve 42. This retaining nut 76 is held against rotation with respect to the collet sleeve 62 by a set screw 78 and rotates with the collet sleeve 62 and the rest of the rotating assembly. A rear threaded retaining ring 79 may be threaded into an inner peripheral thread at the rear of the housing 30. This ring 79 bears against the outer race of the rear bearing 60 and provides for additional radial alignment of the bearing 60. The rim of the nut 76 may be provided with a helical groove to expel foreign material in the same way as the groove 83. Set screws similiar to those set screws 70 in the front ring 68 may be used to hold the rear ring 79.

The retaining nut 76 also has several holes 80 which are spaced by equal angular separations at the same radial distance from the axis of the nut 76. A hole 82 in the collet clamp nut is moved into alignment with one of the holes 80 in the bearing retaining nut 76 when the collet clamp nut has been screwed into the collet to the position which develops the requisite clamping force on the head of the collet 38. Then a plunger 84, which is biased in the forward direction by a helical compression spring 86, enters the hole 80 and locks the collet clamp nut 40 against further rotational movement. A cross-pin 88 in the plunger 84 is used to manually hold the plunger 84 withdrawn from the desired hole 80 until the collet clamp nut 40 is in the desired position.

After the bushing is assembled and the collet clamp nut 40 is set in position with the plunger 84 in place in the hole, a pneumatic collet opener assembly 92 is screwed onto the clamp nut 34. The opener 92 has a section 94 which defines a cylinder in which a flanged disc 96 fits. The flanged disc 96 serves as a piston to define a chamber 98 in the cylinder section 94. "O" rings 100 and 102 seal the chamber and allow the piston 96 to move axially. A port 104 and line from a source of air of vacuum is connected to the chamber 98. When pressurized air is applied and enters the chamber 98 the piston 96 bears against the rear end of the collet clamp nut 40. This will force the collet 38 forward out of the tapered end of the collet sleeve 42 and release the stock 16. When vacuum is applied, the piston 96 releases and the collet returns to clamp the stock 60 with sufficient force to enable the collet and the rest of the rotating assembly to rotate with the stock 60 as the stock is rotated by the spindle 14 of the machine 10 (see FIG. 1).

Figure 5:
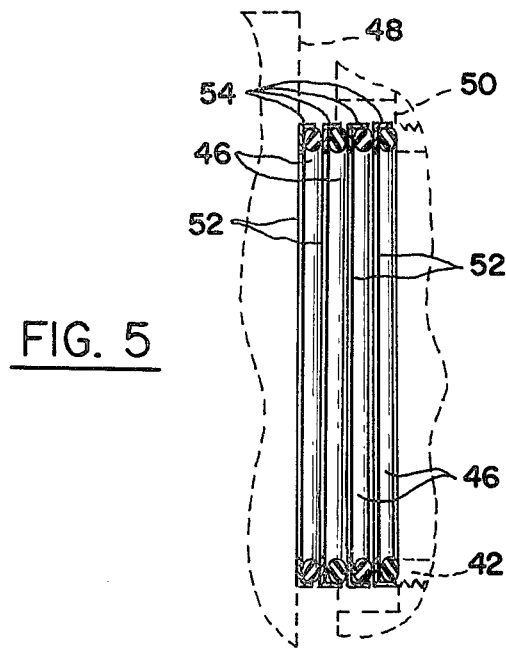
FIG. 5 is a view showing the "O" ring mechanism with the "O" rings compressed and in operating position in the bushing.

FIG. 4 shows the collet clamp nut 40 and "O" rings 46 prior to setting of the collet clamp nut in position to cause the collet to clamp on and grip the stock with sufficient force to enable rotation of the collet and its assembly with the stock as the stock rotates but permits axial translation of the stock through the collet 38. The "O" rings 46 are separated. Now, when the collet clamp nut 40 is screwed onto the threaded rear end 41 of the collet, the "O" rings 46 become compressed between the opposed shoulder 48 and end 50 surfaces of the collet clamp nut 40 and collet sleeve 42, respectively. The "O" rings 46 become oblong in shape as they are compressed (see FIG. 5). The rims 54 of the retaining rings 52 keep the "O" rings from snapping out of position and insure that they apply a constant force to the collet sleeve. The interaction of the tapered head end of the collet 38 and collet sleeve 42 causes a force due to the compression of the "O" rings 46 to be applied to grip and clamp the stock 16. Now, the stock, collet and the rest of the assembly which is rotatably mounted in the bearings 56, 58 and 60, rotate with the stock 16. Oil is fed by gravity through a line 106 into the space between the bearings 56 and 58 and lubricates these bearings and also the other bearing 60.

Should the stock move axially to the right, it will carry the collet towards the right and allow the "O" rings to further compress. This enables the collet to expand and the stock 16 to be released. If the stock 16 is translated to the left there is sufficient freedom because the "O" rings 46 are not fully compressed to enable the collet 38 to expand to an extent sufficient to release the stock 16. Accordingly, the stock can translate while the bushing rotates with the stock.

Because of the expansible and contractile nature of the collet 38 and because of its gripping relationship with the stock 16, both positive and accurate guidance is provided, even though the diameter or cross sectional configuration of the stock 16 may vary over a wide tolerance range. By selecting the cross sectional shape of the bore in the collet, stock of various cross sections, such as square or hexagonal, can be accommodated. Whatever the shape of the stock, it rotates with the guide bushing provided by the collet 38 and is precisely and positively guided in the screw machine.

From the foregoing description it will be apparent that there has been provided an improved guide bushing for Swiss-type automatic screw machines. Variations and modifications of the hereindescribed guide bushing within the scope of the invention will undoubtedly suggest themselves to those skilled in the art. Accordingly, the foregoing description should be taken merely as illustrative and not in any limiting sense.

I claim:

1. For use in a Swiss-type screw machine having a bracket through which stock can move axially while being rotated, an arrangement for holding and guiding said stock in said bracket which comprises
    guide means having a passage therethrough for said stock, said guide means being rotatably mounted in said bracket,
    means rotatable with said guide means for clamping said guide means against said stock with sufficient force to cause said guide means and clamping means to rotate with said stock and to permit said stock to move axially with respect to said guide means,
    said spring means comprising at least one "O" ring of elastomeric material and said clamping means comprising means attached to said cylindrical member for compressing said "O" ring to apply said sufficient force to said one end of said cylindrical member.

2. The invention as set forth in claim 1 wherein said cylindrical member is tapered radially outward at said one end, said clamping means further comprises a sleeve and mounted in axially movable relationship with respect to said cylindrical member and around said cylindrical member and bearing against said tapered one end of said cylindrical member for contracting said one end into clamping relationship with said stock, and said means attached to said cylindrical member being a second cylindrical member having a bore therethrough for passage of said stock and having a first surface perpendicular to the axis of said cylindrical members, said first cylindrical member having a second surface perpendicular to said axis and opposed to said first surface, said "O" ring being disposed between said surfaces.

3. The invention as set forth in claim 2 wherein said second cylindrical member is threaded at one end thereof and said first cylindrical member is threaded at the end thereof opposite to said one end, said second member being screwed into first member at said threads, to apply said sufficient force as a function of the distance said second member is threaded into said first member.

4. The invention as set forth in claim 3 further comprising ball bearing means around said sleeve for rotatably mounting said sleeve and said cylindrical members for rotation in said bracket, said sleeve having a flange, means including a retaining ring around said sleeve and attached thereto for mounting said bearing means in axially loaded relationship between said ring and said flange.

5. The invention as set forth in claim 4 wherein said retaining ring has a plurality of axially oriented holes therein, said second cylindrical member has a hole therein, said hole in said second cylindrical member being spaced radially for alignment with any one of said ring holes when said second member rotates into coaxial relationship therewith as said second cylindrical member is screwed into said first cylindrical member, a plunger in said hole in said second cylindrical member, and spring means biasing said plunger into the one of said ring holes which is aligned with said hole in said second cylindrical member.

6. For use in a Swiss-type screw machine having a bracket through which stock can move axially while being rotated, an arrangement for holding and guiding said stock in said bracket which comprises
    guide means having a passage therethrough for said stock, said guide means being rotatably mounted in said bracket,
    means rotatable with said guide means for clamping said guide means against said stock with sufficient force to cause said guide means and clamping means to rotate with said stock and to permit said stock to move axially with respect to said guide means,
    said guide means being a collet, and said clamping means comprising a sleeve around said collet, a collet clamp nut threadedly received in said collet, spring means between said clamp nut and said sleeve for applying said sufficient force to the head of said collet, said spring means being provided by a plurality of "O" rings of elastomeric material, said collet clamp nut having a shoulder and said sleeve having a surface, said shoulder and surface being perpendicular to the axis of said collet, said "O" rings being disposed in side-by-side relationship between said shoulder and surface.

7. The invention as set forth in claim 6 further comprising a plurality of retaining rings of diameter larger than said "O" rings, each retaining ring having an axially extending rim, said "O" rings being disposed each adjacent a different one of said retaining rings with said rims thereof around a portion of the one of said "O" rings disposed adjacent thereto.

8. The invention as set forth in claim 6 further comprising fluid operated collet opening means having a cylinder and a plunger, said plunger being axially movable into engagement with said collet clamp nut.

9. The invention as set forth in claim 7 further comprising a housing, a plurality of ball bearings each having an outer race and an inner race, the inner races of said bearing being mounted upon said sleeve and the outer races being mounted on the inner periphery of said housing, said housing having a shoulder, a first of said bearings being mounted with its outer race against said shoulder, a cylindrical spacer between the inner race of said first bearing and the inner race of a second of said plurality of bearings, a bearing retaining ring threaded into said housing and sandwiching the outer races of said first and second bearings between said ring and shoulder with a predetermined loading force.

10. The invention as set forth in claim 9 wherein said plurality of bearings includes a third bearing said sleeve having a flange at one end thereof, said second bearing being mounted with its inner race between said cylindrical spacer and said flange, a spacer ring of diameter less than the inner diameter of said outer race of said second and third bearings, said spacer ring being disposed between the inner races of said second and third bearings, said first bearing being mounted sandwiched between said spacer ring and said cylindrical spacer, and a retaining nut threaded onto said sleeve and disposed against the inner race of said third bearing in the direction of said flange for mounting said bearings upon said sleeve between said retaining nut and said flange.

11. The invention as set forth in claim 10 including a retaining ring threaded into said housing and bearing against the outer race of said third bearing to control the radical alignment thereof.

12. The invention as set forth in claim 9 wherein said sleeve has a flange at the end thereof adjacent to the tapered end of said collet, said bearing retaining ring being spaced radially from the rim of said flange to define a clearance there between, and one of said rim and the inner periphery of said ring having a helical groove pitched in a sense opposite to the sense in which said stock rotates to expel material from said clearance.

* * * * *